United States Patent
Schaper et al.

(10) Patent No.: US 11,952,980 B2
(45) Date of Patent: Apr. 9, 2024

(54) METHOD FOR CONTROLLING A WIND POWER INSTALLATION

(71) Applicant: Wobben Properties GmbH, Aurich (DE)

(72) Inventors: Ulf Schaper, Staffhorst (DE); Enno von Aswege, Großefehn (DE); Paul Gerke Funcke, Oldenburg (DE)

(73) Assignee: Wobben Properties GmbH, Aurich (DE)

( * ) Notice: Subject to any disclaimer, the term of this patent is extended or adjusted under 35 U.S.C. 154(b) by 121 days.

(21) Appl. No.: 17/579,389

(22) Filed: Jan. 19, 2022

(65) Prior Publication Data
US 2022/0235737 A1    Jul. 28, 2022

(30) Foreign Application Priority Data
Jan. 22, 2021 (EP) .................................... 21152924

(51) Int. Cl.
*F03D 7/02* (2006.01)
*F03D 7/04* (2006.01)

(52) U.S. Cl.
CPC ......... *F03D 7/0276* (2013.01); *F03D 7/0224* (2013.01); *F03D 7/028* (2013.01);
(Continued)

(58) Field of Classification Search
CPC ...... F03D 7/0224; F03D 7/0276; F03D 7/028; F03D 7/043; F03D 7/044; F03D 7/047;
(Continued)

(56) References Cited

U.S. PATENT DOCUMENTS

| | | | | |
|---|---|---|---|---|
| 4,193,005 A | * | 3/1980 | Kos ........................ | F03D 7/0264 416/41 |
| 7,863,767 B2 | * | 1/2011 | Chapple .................. | F03D 7/043 290/43 |

(Continued)

FOREIGN PATENT DOCUMENTS

| | | |
|---|---|---|
| CN | 103187912 A | 7/2013 |
| CN | 103758698 A | 4/2014 |

(Continued)

*Primary Examiner* — Christopher R Legendre
(74) *Attorney, Agent, or Firm* — Seed IP Law Group LLP

(57) ABSTRACT

A method for controlling a wind power installation having a rotor operated with variable speed and having rotor blades that are adjustable in their blade angle. The installation is controlled in a partial-load range by an open-loop operating-characteristic control, which uses an operating characteristic. The operating characteristic presets a relationship between the rotational speed and a generator state variable to be set that is a generator power or torque. A value of the generator state variable preset by the operating characteristic is set in dependence on a detected speed. The installation is controlled in a full-load range by a closed-loop pitch control, in which the rotational speed is controlled to a speed setpoint value by adjusting the blade angles. In a presettable range of the partial-load range and/or in a transitional range from the partial-load range to the full-load range, the installation is controlled by a speed-power control.

26 Claims, 5 Drawing Sheets

(52) U.S. Cl.
CPC ............. *F03D 7/044* (2013.01); *F03D 7/047* (2013.01); *F05B 2270/1011* (2013.01); *F05B 2270/1012* (2013.01); *F05B 2270/1021* (2013.01); *F05B 2270/1033* (2013.01); *F05B 2270/32* (2013.01); *F05B 2270/327* (2013.01); *F05B 2270/328* (2013.01); *F05B 2270/335* (2013.01); *F05B 2270/706* (2013.01)

(58) Field of Classification Search
CPC ...... F05B 2270/1011; F05B 2270/1021; F05B 2270/32; F05B 2270/327; F05B 2270/328; F05B 2270/335; F05B 2270/706
See application file for complete search history.

(56) References Cited

U.S. PATENT DOCUMENTS

| | | | | |
|---|---|---|---|---|
| 8,803,347 | B2* | 8/2014 | Larsen | .................... H02P 9/008 |
| | | | | 290/55 |
| 2022/0010772 | A1* | 1/2022 | Von Aswege | ......... F03D 7/0276 |
| 2022/0235737 | A1* | 7/2022 | Schaper | ................ F03D 7/0276 |

FOREIGN PATENT DOCUMENTS

| | | | |
|---|---|---|---|
| CN | 108923473 A | 11/2018 | |
| EP | 3 179 097 A1 | 6/2017 | |

\* cited by examiner

METHOD FOR CONTROLLING A WIND POWER INSTALLATION

BACKGROUND

Technical Field

The present invention relates to a method for controlling a wind power installation. The present invention also relates to a corresponding wind power installation.

Description of the Related Art

Wind power installations are known; they obtain electrical power from wind. For this purpose, they usually have a rotor with rotor blades, which are moved by the wind. The rotor then rotates at a rotor speed, which also depends on the wind speed, and drives a generator.

For controlling this power generation, the rotor blades can be adjusted in their angle of attack, which is referred to as pitching. Furthermore, the output power or a generator torque of the generator can be influenced for controlling the wind power installation. This also results in a variable rotor speed, and consequently variable generator speed. In the case of a gearless wind power installation, the rotor speed corresponds to the generator speed.

Controlling the wind power installation particularly has the task of ensuring operation at low rotational speeds with the most optimum possible power, in which as much power as possible is generated. When there are high wind speeds, the wind power installation has to be controlled in such a way that a rotational speed limitation and a power limitation are maintained.

When there are low wind speeds, it can also be said that it is in partial-load operation or the partial-load range and, when there are high wind speeds, it can also be said that it is in full-load operation or the full-load range. In partial-load operation, therefore, as much power as possible has to be generated and, in full-load operation, the wind power installation has to be controlled in such a way that it is protected from overloading.

Corresponding control concepts are known. Accordingly, open-loop control based on a characteristic curve, in which an operating characteristic presets a relationship between rotational speed and power to be set for it, is usually used for partial-load operation. The blade angle is in this case mostly constant. Mostly used in full-load operation is a closed-loop speed control, which attempts to use the adjustment of the rotor blades to ensure that, with constant power, the rotational speed is likewise kept constant.

Further particular provisions may be added to these basic requirements. For instance, it is often the case that the rotational speed range in partial-load operation also includes a speed range in which there is a point of resonance of the wind power installation. In order to obviate this problem, it may be provided that such a point of resonance is circumvented by avoiding rotational speeds that lie in such a resonance range. However, circumventing a rotational speed may be problematic, because a point of discontinuity is thereby created in the operating characteristic. That may lead to problems in the practical implementation of such circumventing control.

Further problems may arise in the transitional range from partial-load operation to full-load operation. Here it is particularly critical that the operating characteristic is comparatively steep, so that a small change in rotational speed leads to a great change in power, which may be a challenge for control technology and particularly cause problems similar to those caused by a point of discontinuity. In addition to this, for such points of discontinuity or almost discontinuous ranges, fluctuations of the wind speed may lead to high controller activity, possibly excessive controller activity.

BRIEF SUMMARY

One or more embodiments are directed to providing control that also works well in rotational speed ranges that lie in the range of a resonant frequency and/or in the range of a transition from partial-load operation to full-load operation.

Provided is a method for controlling a wind power installation having an aerodynamic rotor which is operated with variable speed and which has rotor blades that are adjustable in their blade angle. The wind power installation may be operated in a partial-load range and in a full-load range. In the partial-load range, there are wind speeds up to a rated wind speed, and in the full-load range there are wind speeds from the rated wind speed. The ranges may overlap slightly, especially since the wind speed can fluctuate and also cannot be determined to any accuracy whatsoever.

At the same time, the wind power installation in the partial-load range is controlled by an open-loop operating-characteristic control that uses an operating characteristic. The operating characteristic presets a relationship between the rotational speed, to be specific the rotor speed, and a generator state variable to be set. The generator state variable to be set may be a generator power or a generator torque. In this case, the operating-characteristic control takes place such that a value of the generator state variable preset by the operating characteristic is set in dependence on a detected speed. An operating characteristic may also be preset by a functional description, for example a formula or function. The operating characteristic may also be stored as a table.

If, therefore, the generator state variable is the generator power, a rotational speed is detected and the operating characteristic gives for the detected rotational speed an associated value to be set of the generator power. This generator power is then set. Usually, the blade angle is left unchanged here. The set generator power then also leads in dependence on the rotational speed to a generator torque, which counteracts a rotor torque that is produced in the rotor by the wind.

If these two torques are equal, a stable operating point has been obtained. If these two torques are not equal, the rotor accelerates or slows down. The rotor speed therefore changes, and consequently a new value for the generator power is determined from the operating characteristic and is set, until a stable operating point is obtained.

In the full-load range, the wind power installation is controlled by a closed-loop pitch control, in which the rotational speed is controlled to a speed setpoint value by adjusting the blade angles. In particular, here the rotational speed is controlled to a rated speed value. This serves particularly for protecting the wind power installation from overloading. If, therefore, the rotational speed exceeds this speed value to which the wind power installation is to be controlled, the rotor blades are adjusted in their blade angle, to be specific are turned out of the wind, at least by a degree or a few degrees. As a result, less power is taken from the wind and as a result the rotational speed can be lowered or kept at the desired value.

It is further proposed that, in at least one presettable speed range of the partial-load range and/or in a transitional range from the partial-load range to the full-load range, the wind power installation is controlled by a speed-power control, in which the rotational speed is controlled to a speed setpoint value by adjusting the generator state variable. In these ranges there is consequently a departure from the operating-characteristic control that is otherwise provided for the partial-load range.

This may be particularly intended for a rotational speed range of the partial-load range which consequently forms a small segment of the partial-load range in which a resonant frequency can occur, or in which there is a point of resonance. Particularly, this presettable speed range of the partial-load range may be referred to as an avoidance range, in which to be specific there is a speed that is to be avoided. This provided speed-power control then allows the rotational speed to be controlled to a speed at the beginning or end of the presettable speed range of the partial-load range. Consequently, the rotational speed that lies in particular in the middle of such a speed range, which therefore lies in the middle of the avoidance range, can be omitted.

Two control cascades are provided here for this speed-power control. The speed-power therefore takes place such that, in an outer cascade, a first acceleration setpoint value of the rotor is determined from a comparison of a preset setpoint speed with a detected actual speed by way of a first closed-loop controller. To this extent, this control error of the speed is converted into this acceleration setpoint value. This acceleration setpoint value of the rotor can consequently be understood as an acceleration value by which the rotor is to be accelerated. The acceleration setpoint value may also assume negative values and to this extent indicate how the rotational speed is to be reduced.

It is then also provided that, in an inner cascade, a generator setpoint value is determined as a setpoint value for the generator state variable from a comparison of the first acceleration setpoint value with a detected acceleration actual value of the rotor by way of a second closed-loop controller. The second controller therefore converts the control error of the rotor acceleration into a generator power setpoint value or a generator torque setpoint value, depending on which of the two variants is provided for the generator state variable.

Consequently, for the operating-characteristic control in the partial-load range, a change to a closed-loop speed control is proposed for particular ranges. A change is therefore made from an open-loop control to a closed-loop control. For the closed-loop control, to be specific the speed control, a special cascade structure which controls the rotational speed in the outer cascade and for this controls a torque in the inner cascade is provided here.

It has particularly been recognized in this respect that, by such speed control when there are points of discontinuity or points with a very steep slope in a speed-power characteristic, the torque, and consequently also the power, can be well controlled at the same time. It has particularly been recognized here that great changes in power can occur when there are small changes in rotational speed, and these can in this way be controlled. The occurrence of great rotor accelerations can be avoided. In addition to this, as a result an interaction between the speed controller and a power controller is made possible or is made easier. This is also explained below in at least one exemplary embodiment.

According to one aspect, it is proposed that the speed-power control has an integral component (e.g., integration capability), in particular that the second controller has an integral component. Here it has particularly been recognized that, when there are points of discontinuity or very steep speed-power curves, it may be appropriate to keep the speed to one value, for which the integral component can be used. The integral component allows the output power to be maintained even without permanent control errors.

In particular, it has been recognized that it is not required to provide this integral component in the outer controller cascade. This avoids a deviation between the set speed and the actual speed leading to an increasing value of the set torque. Instead, the integral component may be used in the inner cascade. The inner cascade produces from the setpoint/actual-value comparison for the acceleration value a generator power or a generator torque, which can to this extent be regarded as a manipulated variable. As a result, a ramping up of this manipulated variable by the integral component is immediately implemented in the generator and could have an immediate effect, so that the integral component in this inner cascade is proposed.

According to one aspect, it is proposed that, in the speed-power control, the first acceleration setpoint value and the acceleration actual value are respectively formed as an acceleration power. The acceleration power is assigned to a rotor acceleration and describes a power that is required to bring about the rotor acceleration. As a result, particularly the difference between a setpoint acceleration and an actual acceleration can also be expressed and evaluated as power. Such power may also be correlated with power that is available for closed-loop control. It is particularly advantageous to use this to facilitate matching with the closed-loop control in the full-load range. The two closed-loop controls can become comparable by the consideration of this power in corresponding manipulated variables or control variables.

According to one aspect, it is proposed that, in the speed-power control, the outer cascade has for determining the first acceleration setpoint value at least one acceleration limit value. If an acceleration power is considered for the acceleration, corresponding power limit values may be provided. As a result, the speed control can be kept within relevant limits. In particular, it is achievable that it can be taken into account how much power is available at all for the implementation of the speed control. This advantage is not only achievable when an acceleration power is considered for the acceleration. Both the power available from the wind and the generator power that can be set may also be taken into account as available power.

It may particularly be taken into account that a maximum power for driving the rotor is given by the wind speed. At a specific operating point, it is likely that a large part of the available power from the wind is already being used. This may then leave a differential power up to the maximum power that can be taken, which is available for the speed control. This can be taken into account in the at least one acceleration limit value. The situation is similar with the generator, which likewise cannot be adjusted however desired from its operating point at the time, and consequently can only provide power for the speed control up to a specific value. This can be taken into account. Moreover, also when reducing the power taken from the wind at an operating point, a lower value can also be taken into account. Such a lower value may be—to overstate it somewhat in illustrative terms—such a value at which the wind power installation threatens to stand still.

It is correspondingly preferably proposed that the at least one acceleration limit value is settable. As a result, it can be adapted to the circumstances explained.

It is also or alternatively proposed that an upper acceleration limit value and a lower acceleration limit value with different values are provided as the at least one acceleration limit value. Here it is particularly also taken into account that, for aerodynamic reasons, available power for increasing the rotational speed may be of a different magnitude than power for reducing the rotational speed.

It is also or alternatively proposed that the inner cascade has for determining the manipulated variable for setting the generator state variable an integral element with an integrator limitation. Optionally, such an integrator limitation is settable and also or alternatively different upper and lower limit values are provided for the integrator limitation. Advantages in relation to using the integral element in the inner cascade and consequently in the second controller have already been described above.

Here it is additionally proposed to provide an integrator limitation for the respective integral element. It can in this way particularly be prevented that, when there is a permanent system deviation, the integral component keeps rising, or in the negative direction keeps falling. Here, too, it has been taken into account that only a limited power is available as adjustment energy for implementing the speed control. This is taken into account by the limitation of the integral element and it can in this way be avoided that the integral element presets a manipulated variable, in particular a corresponding setpoint power, that cannot be implemented at all. To take this into account particularly well, it is proposed to preset the integrator limitation in a settable manner and/or to take corresponding power limits into account by different upper and lower limit values.

According to one aspect, it is proposed that the at least one presettable speed range is respectively provided as a speed avoidance range, which is characterized by a lower avoidance speed and an upper avoidance speed. It is provided in this respect that the speed-power control is used if the lower avoidance speed is reached when there is increasing rotational speed or the upper avoidance speed is reached when there is decreasing rotational speed. It is particularly provided that such an avoidance speed range is formed around a rotational speed that forms a resonant frequency or contributes to exciting a resonance in the wind power installation.

It is further proposed in this respect that, when using the speed-power control, the wind power installation can, in dependence on a prevailing wind speed, be operated in a lower speed range, which includes the lower avoidance speed, at a lower operating point, and in an upper speed range, which includes the upper avoidance speed, at an upper operating point, and changing between the lower operating point and the upper operating point is carried out in dependence on an aerodynamic evaluation of the lower operating point and upper operating point.

This aspect is therefore based on the idea that, when using the speed-power control, the wind power installation can be operated at one of these two operating points, to be specific essentially below or above the resonance situation to be avoided, to express it in illustrative terms. If the wind speed then changes, a change from the upper operating point to the lower operating point, or vice versa, may come into consideration. For such a change, it is proposed to carry out an aerodynamic evaluation of the lower operating point and upper operating point.

This is particularly based on the idea that, by using the speed control, which to be specific is carried out here by the proposed speed-power control, the rotational speed is substantially constant in spite of variable wind speed. The rotational speed is therefore not well-suited as a criterion as to whether a change between the two operating points is appropriate. For this reason, it is proposed to perform an aerodynamic evaluation of the two operating points and in particular to make a change whenever the other operating point respectively is aerodynamically better or better suited.

Here it has particularly also been recognized that just an assessment of the generator power that is adjusted in this speed-power control may be unsuitable.

According to one aspect, it is proposed that, for changing between the lower operating point and the upper operating point, an at least two-stage check is performed. In this case, in a first stage, it is checked whether the operating point to which it is intended to change has a higher aerodynamic efficiency than the operating point from which it is intended to change. In a second stage, it is checked whether the generator state variable that is determined by the closed-loop partial-load speed control reaches an upper or lower generator state limit. Such a generator state limit may be in particular a preset maximum power value. If the generator power reaches this value, that is to say the generator power rises to this value during operation at the lower operating point, that leads to changing from the lower operating point to the upper operating point. Correspondingly, a lower power value may be preset, leading to a change from the upper operating point to the lower operating point if the generator power falls to this lower power limit.

In particular, it is provided that, dependent on the check in the first stage, a change is allowed, and, dependent on the check in the second stage, a change is prescribed. If, therefore, the operating point at the time is less favorable than the other operating point, that is to say it has a lower aerodynamic efficiency than the operating point to which it is intended to change, a change comes into consideration. However, the change does not then have to be carried out, and it may rather be that it depends on other conditions. Such another condition may be for example how much the wind fluctuates. If it is fluctuating greatly, a change between the operating points is made more cautiously. If, however, the wind speed is scarcely fluctuating, it is more likely to be appropriate to change to the operating point with the higher aerodynamic efficiency, since it can be assumed that it will also remain the operating point with the higher aerodynamic efficiency for a time.

If, however, a limit is reached, which is established in the second stage, a change must be made. This is particularly based on the finding that non-optimum operating points can be accepted for a time. The disadvantages can be weighed against other criteria.

For example, an operating point with a higher aerodynamic efficiency promises a greater yield. This may, however, be compared with the loss of yield due to the change, and it may then additionally be taken into account whether or not frequent changing is to be expected.

It has, however, also been recognized that an operating point that is too unfavorable may possibly put at risk the overall operation of the wind power installation. If, for example, the wind power installation is operated in the lower speed range, in particular with the lower avoidance speed, while the power keeps increasing, this can have the effect that the operating point becomes so aerodynamically unfavorable that the wind power installation stops, to give just one example.

According to one aspect, it is proposed that a change between the lower operating point and the upper operating point is carried out if the operating point to which it is intended to change has for a predeterminable checking time period a higher aerodynamic efficiency than the operating point from which it is intended to change. As a result, it can be avoided that, in spite of higher aerodynamic efficiency of the other operating point, a change is made too quickly. In particular, the predeterminable checking time period lies in a range from 5 seconds to 10 minutes, in particular in the range from 10 seconds to 5 minutes. These time periods have a lower value which may be suitable for checking sufficiently long whether the operating points or the wind conditions on which they are based are stable. Both of the upper values of 5 minutes and 10 minutes indicate a time in which losses due to change no longer predominant. The specific choice may depend particularly on how much the two operating points differ. This in turn may depend on how great the speed avoidance range must be chosen to be.

According to one aspect, it is proposed that, for the speed-power control, the speed setpoint value is preset as a constant or is preset by way of at least one speed characteristic, the speed characteristic having in each case speed values in dependence on the generator state variable to be set. In particular, it is provided that the speed characteristic is formed such that it at least partly has a negative slope, so that, with increasing values of the generator state variable, the speed values decrease.

Consequently, a steep, in particular vertical, branch according to a speed/power diagram is proposed. The explanations apply analogously to the generator torque as a generator state variable if a speed/torque diagram is used. That the speed setpoint value is preset as a constant means that, when there is increasing wind, an increase in the rotational speed is countered by corresponding increasing of the power. Particularly a controller with an integral component allows steady-state accuracy to be achieved for the preset constant speed setpoint value, to be specific by a correspondingly high generator power as the manipulated variable. When there is increasing wind, the power therefore increases, without the rotational speed increasing. By analogy, when there is decreasing wind, the rotational speed may remain constant, while however the generator power as the manipulated variable decreases.

It has been recognized that a negative slope can even have advantages over the vertical slope. A negative slope is consequently a scenario in which, when there is increasing wind speed, the rotational speed does not increase due to the speed-power control, and even decreases to some extent, whereas the generator power as the manipulated variable increases considerably. For example, here the generator power may increase by 10%, whereas the rotational speed decreases again by 1%. By such closed-loop control, it can be avoided that a non-unique speed-power branch occurs in the speed-power representation. In other words, as a result, each rotational speed on this branch can be assigned a unique power value.

By analogy, when there is decreasing wind speed, if the wind power installation has reached the upper operating point, the generator power as the manipulated variable may continue to decrease, but the rotational speed may even increase again to some extent. Here, too, an example that comes into consideration is that the generator power in this case decreases by 10%, whereas the rotational speed only decreases by 1%. A corresponding straight line or linear relationship can in this way be established. In other words, a power reduction by 5% would be assigned a speed increase by 0.5%. The same also applies analogously to an increase in the wind speed, and consequently an increase in the power, starting from the lower operating point.

According to one aspect, it is proposed that, for changing between the lower operating point and the upper operating point, a change time is preset, preferably less than 20 seconds, in particular less than 10 seconds. It is also or alternatively proposed that a progression over time is preset for the generator state variable to be set, in order in this way to control the change.

By the speed-power control, the wind power installation is operated and kept at an operating point, therefore at an approximately predetermined rotational speed. For this purpose, the generator power is correspondingly set as the generator state variable and continually readjusted. All of this may of course also be carried out with the aid of the generator torque as the generator state variable.

If then it is intended to change between the operating points, that is to say for example from the lower operating point to the upper operating point, this generator state variable, which therefore forms the manipulated variable of the speed-power control, is lowered. As a result, the rotor can accelerate. The more this generator state variable is lowered for the change from the lower operating point to the upper operating point, all the more quickly the change can be made. The change time can therefore be realized in this way.

When choosing the change time, preferably boundary conditions must also be taken into account, so that a change as quick as however desired does not have to be the only appropriate objective. Limit values must also be taken into account. In particular, it must be taken into account what value must be expected for the generator state variable after the change. Thus, for example, the value of the generator state variable to be expected after the change could also be set for the changing process. After the change, this operating point with the associated generator state variable is then directly adopted.

That may however lead to a change that is too slow. Therefore, when there is a change from the lower operating point to the upper operating point, the generator state variable would have to be set correspondingly lower. If it is set too low to change too quickly, an overshoot could be caused by the generator state variable not reaching the desired value quickly enough when the desired rotational speed is reached after the change. It is correspondingly proposed to preset a change time, and the generator state variable to be set can for example be determined in a simulation, or from empirical values or specific tests.

When changing from the upper operating point to the lower operating point, a corresponding procedure is analogously also adopted, in which the value of the generator state variable is correspondingly raised, but should not be raised too much. Also for this, a suitable value for the generator state variable can be determined by way of the proposed presetting of the change time.

It is consequently additionally or alternatively proposed to preset a progression over time for the generator state variable to be set. For the change from the lower operating point to the upper operating point, such a progression over time may particularly take the form that the generator state variable continuously falls for a specific time, in particular for half the change time, and continuously rises for the remaining time, to be specific in particular to the value that has been determined as appropriate for the adopted upper operating point, for example calculated or determined by a simulation.

Analogously, the generator state variable would correspondingly first rise and then fall when it is intended to change from the upper operating point to the lower operating point.

According to one aspect, it is proposed that the transitional range in the partial-load range lies in an upper speed range that is characterized by rotational speeds from a transitional speed. The upper speed range lies in particular above the speed avoidance range, if such a range exists.

It is further proposed in this respect that the wind power installation is characterized by a rated speed and the transitional speed is at least 80%, in particular at least 85%, of the rated speed and/or of a setpoint speed of the pitch control. To this extent it is proposed here to use the speed-power control in this transitional range, and consequently to use the speed-power control for such high rotational speeds of 80% or 85% of the rated speed up to the full-load range, that is to say up to 100% of the rated speed. The pitch control, if it is active, attempts to control the speed to the setpoint speed, to be specific by means of pitch adjustment. This setpoint speed corresponds substantially to the rated speed, but it may possibly be better taken into account in the specific implementation, particularly in the controlling structure. It is moreover the transitional range from the partial-load range to the full-load range, in which the speed setpoint value is preset for the pitch control, so that there is appropriate orientation. The following explanations of the rated speed similarly apply analogously to the setpoint speed.

Here it has particularly been recognized that, in this speed range from 80% or 85% to 100% of the rated speed, an operating characteristic is very steep. A small change in speed therefore leads to a very great change in the generator state variable. For example, an increase in the rotational speed by 1% may lead to an increase in the generator state variable of 3% or more. Particularly with respect to the range from 95 to 100% of the rated speed, a change in speed by 1% may lead to a change in the generator state variable by 5% to 10%. Small fluctuations of the wind speed consequently lead to small changes of the rotational speed and these lead to great changes of the generator state variable. In order to address these problems in this specific range, the use of the speed-power control is consequently proposed there.

A speed control therefore takes place, but differs from the speed control in the full-load range to be specific because it uses the generator state variable, that is to say the generator power or the generator torque, as a manipulated variable. The proposed cascade control additionally allows the rotor acceleration, and consequently the dynamic response, also to be taken into account here. Particularly this is not possible by the use of the operating-characteristic control, since the operating-characteristic control merely sets the generator state variable, that is to say the generator power or the generator torque, for a detected rotational speed. No account is taken of how quickly the rotational speed changes here. For low rotational speeds, which moreover are usually also based on low wind speeds with lower fluctuations, this may be a good, tried-and-tested strategy. In the steep range described, in which moreover stronger wind fluctuations are also to be expected, an improvement can however be achieved by the use of the speed-power control.

According to one aspect, it is proposed that, for the speed-power control, the speed setpoint value is preset by way of a transitional speed characteristic, which forms the or a speed characteristic, the transitional speed characteristic running vertically for a rotational speed with a speed value in correspondence with the transitional speed, so that with an increasing generator state variable the rotational speed is constant until the generator state variable reaches a predetermined first generator reference value, which lies below a rated value of the generator state variable.

Consequently, for this transitional range, it is not only proposed to use the speed-power control instead of the operating-characteristic control, but there is also another speed-power characteristic—or speed-torque characteristic—stored, to be specific running vertically as from the transitional speed. This also implies that, when there is increasing wind speed, the rotational speed initially is not increased any further from when the transitional speed is reached. The installation is therefore operated at a lower rotational speed there in comparison with the operating characteristic.

It can particularly be achieved in this way that the rated speed, to be specific from which full-load operation begins, and consequently the corresponding closed-loop control, is not reached too early. Particularly, with the operating-characteristic control with the very steep operating characteristic, the rotational speed can often reach the rated speed due to wind fluctuations. It must then be checked how to respond to this, to be specific whether this activates the speed control that is provided for full-load operation. It could give rise to a frequent change between operating-characteristic control and pitch control, which is avoided by the solution proposed here.

It may also or alternatively be provided that, from the transitional speed, the transitional speed characteristic still has a positive slope and/or that, from the first generator reference value, it has a positive slope, so that the values of the generator state variable increase with increasing rotational speed until a rated value of the generator state variable has been reached. Designing the transitional speed characteristic such that it has a positive slope from the transitional speed and reaches up to the rated speed is not the preferred solution, but may be provided. Then, it may nevertheless be provided that the transitional speed characteristic differs in that range from the operating characteristic. In particular, it may be linear, and consequently lie above the operating characteristic in this range. The rotational speed is then controlled along this transitional speed characteristic, to be specific with the proposed closed-loop speed-power controller.

It is however particularly provided that, from the transitional speed, the transitional speed characteristic runs vertically until the generator reference value is reached, the transitional speed characteristic having a positive slope from there. However, it preferably reaches a rated value of the generator state variable, that is to say a rated power or a rated torque, before the rotational speed has reached the rated speed. As a result, this rated value of the generator state variable is then already reached in the partial-load range and only then is the rotational speed increased up to the rated speed, in order then or thereby to go over into the full-load range and the corresponding closed-loop control in the full-load range.

According to one aspect, it is proposed that a control reserve is determined in dependence on a difference between the set generator state variable and the upper generator state limit. The difference may also form the control reserve directly. That particularly depends on whether the generator state variable has the same physical unit as the control reserve. The control reserve may particularly be formed as power. If the generator state variable is formed as torque, a conversion of a corresponding difference of the torques into this control reserve comes into consideration. It is particularly advantageous if, in the inner cascade, the first acceleration setpoint value and the detected acceleration actual value are provided with the same unit as the control reserve.

It is further proposed that the control reserve is transferred from the speed-power control to the pitch control. The pitch control is a speed control in which the blade angle forms the manipulated variable. To this extent, the speed-power control and the pitch control provide two closed-loop speed controls, which can hereby be coordinated with one another.

It is at the same time further provided that the speed-power control and the pitch control operate at least partially in parallel and are coordinated with one another by way of the control reserve. The control reserve is in this case an indicator of how much adjustment power or adjustment energy the speed-power control still has available at all. If it has a lot of adjustment energy available, the control reserve is large in absolute terms. As a result, it can be signaled to the pitch control that the speed-power control is also not yet at its limits and can still control.

Here it has particularly been recognized that it is advantageous at the transition from the partial-load range to the full-load range initially to leave control as far as possible to the speed-power control. In this case, that is to say if the pitch control is only activated when there are excessive wind speeds, the rotor blades are still optimally aerodynamic, therefore have not yet been turned out of the wind. If in this case the pitch control therefore becomes active, this can only mean that it turns the blades out of the wind. As a result, less power is taken from the wind. If this is necessary for limiting the installations and loading, it should also be carried out; if it is not yet necessary, however, it may also be postponed. Precisely that can be detected by the control reserve and this can as a result be signaled to the pitch control.

The pitch control thereby not only receives information as to whether the speed-power control still has adjustment energy, but it also receives information concerning the level. As a result, the transition can take place continuously. If there is still a lot of adjustment energy available, the control reserve is therefore still large in absolute terms, the pitch control can still remain inactive. If, however, the control reserve is small, but nevertheless still exists, the pitch control may have already become active, while the speed-power control is also still active. Then, both speed controls are active and they are coordinated with one another by way of the control reserve.

Here it has particularly also been recognized that a transition is appropriate, instead of waiting until the speed-power control can no longer control at all because of a lack of adjustment energy. As a result, a hard switchover is avoided and the rapid controlling capability of the speed-power control can still be used.

When there is decreasing wind speed, the transition from pitch control to speed-power control functions analogously in the same way. Operation then therefore goes from the full-load range to the partial-load range and, as soon as it is detected that there is a control reserve, the generator power or the generator torque can therefore be reduced, the transition can commence.

In principle, a switchover may also be provided, but, at least due to account being taken of the control reserve, it can be carried out in relation to a state that is as suitable as possible or a situation that is as suitable as possible.

According to one aspect, it is proposed that the speed-power control is prioritized over the pitch control, in particular such that the pitch control is entirely or partially suppressed as long as the speed-power control does not reach a manipulated-variable restriction. The speed-power control is then given preference.

It is also or alternatively proposed that the pitch control additionally controls the rotational speed in dependence on an acceleration actual value of the rotor and control of the rotational speed by the pitch control is suppressed all the more the further the generator setpoint value lies below a generator setpoint value limit in the speed-power control. It is therefore proposed to fully or partially use the speed-power control as long as it can also be effective. This has already been explained above. It may also be checked whether or not the speed-power control reaches a manipulated-variable restriction. If it reaches the manipulated-variable restriction, the pitch control may be activated or increased in its proportion.

According to one aspect, the pitch control may additionally control the rotational speed in dependence on an acceleration actual value of the rotor. It can in this way particularly be detected whether and how much an excessive rotational speed must be expected shortly, which the pitch control should then counteract. This counteraction may be additionally made dependent on the extent to which the speed-power control is still capable of counteracting it.

It is particularly proposed to take into account the particular structure of the proposed speed-power control, and to particularly take account there of the inner cascade, which determines the generator setpoint value in dependence on the comparison between the first acceleration setpoint value and the detected acceleration actual value by way of the second closed-loop controller.

The generator setpoint value consequently forms a manipulated variable which can act directly or indirectly on the generator. How far this manipulated variable is away from a limit, to be specific the generator setpoint limit, is taken into account here, in order correspondingly to include the pitch control more or less. If the generator setpoint value is still far away from the generator setpoint value limit, the pitch control can be greatly suppressed. If the generator setpoint value approaches the generator setpoint value limit, the pitch control can be correspondingly added to a greater extent to the control. This can be used for determining the control reserve and in this way be sent to the pitch control.

According to one aspect, it is proposed that the speed-power control uses the generator state variable as a manipulated variable for controlling the rotational speed, and this is consequently referred to as the generator manipulated variable, and the pitch control uses the blade angle as a manipulated variable for controlling the rotational speed, and this is consequently referred to as the pitch manipulated variable, the blade angles being increased, in particular with increasing wind speed, in each case from a partial-load blade angle, which is set in the partial-load range, toward an end angle, the speed-power control being coordinated with the pitch control, and in particular the generator manipulated variable and the pitch manipulated variable being coordinated with one another for coordinating the speed-power control with the pitch control.

Such coordination may particularly take the form that the manipulated variable that is used in one controller is subtracted in the case of the other controller, possibly with corresponding conversion of the relevant units. However, it also comes into consideration that the two controllers are coordinated with one another such that the value of the manipulated variable of the one controller can be subtracted directly in the case of the other controller. For this purpose, the two manipulated variables would have to be coordinated with one another, for example by normalizing. As a result, the two controllers can carry out speed control without one compensating for the other or leading to over-control, in which the manipulated variables of the two controllers are in fact added in an uncoordinated manner.

It is particularly proposed that the manipulated-variable restriction of the generator manipulated variable is taken into account and the speed-power control and the pitch control are coordinated such that, as long as it does not reach the manipulated-variable restriction, the speed-power control has a greater influence on the rotational speed than the pitch control. The speed-power control therefore proceeds as long as it can sufficiently implement a manipulated variable.

It is also or alternatively proposed that the pitch manipulated variable is set in dependence on the manipulated-variable restriction of the generator manipulated variable.

In particular, it is provided for this that a difference between the generator manipulated variable and the manipulated-variable restriction defines an adjustment range of the speed-power control and the pitch manipulated variable is changed such that the pitch control has all the smaller influence on the rotational speed the greater the adjustment range of the speed-power control. As a result, a coordination of these two controllers can be achieved in an easy way.

In particular, this adjustment range can be ascertained and taken into account in the coordination in an easy way.

According to one aspect, it is proposed that the pitch control takes place such that, in an outer cascade, a second acceleration setpoint value is determined from a comparison of a preset setpoint speed with a detected actual speed by way of a third closed-loop controller, in an inner cascade, a manipulated variable, in particular the pitch manipulated variable, for adjusting the blade angle is determined from a comparison of the second acceleration setpoint value with a detected acceleration setpoint value by way of a fourth closed-loop controller, and that the comparison of the second acceleration setpoint value with the detected acceleration value forms a control error and the control error is modified by means of the control reserve, and the thus-modified control error forms an input variable of the fourth controller.

The fourth controller is therefore the controller of the inner cascade of the pitch control. This inner cascade takes into account an acceleration setpoint/actual-value comparison. It therefore takes into account whether the detected acceleration of the rotor corresponds to the desired acceleration of the rotor. If that is not the case, this produces a difference, which can be referred to as the control error. This then leads through the fourth controller to a corresponding reaction, to be specific the adjusting of the blade angles. The deviation between desired acceleration and detected acceleration is thereby counteracted.

For coordinating this pitch control with the closed-loop speed-power controller, it is then proposed that this control error, which indicates the acceleration deviation, is modified. Expressed in illustrative terms, this control error of the inner cascade of the pitch control need not be corrected by a pitch control if the speed-power control can instead achieve this by way of the generator. The speed-power control can achieve it by way of the generator whenever there is a corresponding control reserve. Preferably, this control reserve is dimensioned to be made to match the acceleration deviation in the pitch control. The control reserve is then simply subtracted from this acceleration control error in the pitch control. In the extreme case when the speed-power control has a sufficient control reserve, this then produces the value zero and the pitch control can be inactive.

However, it also comes into consideration that the control error of the acceleration is thereby only reduced in the pitch control. This then has the effect that the fourth controller produces or changes the pitch manipulated variable, to be specific such that the pitching is intended to be performed, but only to a reduced extent. As a result, the pitch control can also be coordinated with the speed-power control, to be specific in such a way that it takes into account how well or how much the speed-power control can still act at all. The control reserve is there for this.

Preferably, the acceleration setpoint value, the acceleration actual value and the resulting control error of the inner cascade of the pitch control are respectively formed as power values. As a result, coordination with the speed-power control is simplified.

It is consequently further proposed that the modification takes place in particular such that the adjusting of the blade angle is reduced in comparison with if the control error is not modified, or that the adjusting of the blade angle is suppressed.

It is also or alternatively proposed that the modification takes place in particular such that the control reserve or a variable equivalent to it, in particular proportional to it, is effectively fed forward to the comparison of the second acceleration setpoint value with the detected acceleration value.

Such feed forwarding particularly comes into consideration whenever the pitch control takes into account the acceleration setpoint value, and correspondingly also the acceleration actual value, consequently therefore also the resultant control error as acceleration power, as has already been described above in relation to the speed-power controller. Therefore, here, too, the acceleration power therefore indicates the power that is required to achieve the corresponding acceleration. In this case, the control reserve may form a power value which to be specific indicates how much control power the speed-power control still has available. Precisely this power value is then subtracted from the acceleration control error of the pitch control, which to be specific is then likewise a power.

This produces a simple controlling structure, in which the control reserve simply only needs to be generated in the speed-power control and fed forward in the pitch control, that is to say with a negative sign in order thereby to be subtracted. Of course, some other implementation, which is then probably more complicated, is also possible.

According to one aspect, it is proposed that, in the speed-power control, the first acceleration setpoint value, which is determined in dependence on a comparison of the preset setpoint speed with a detected actual speed, is additionally changed in dependence on a blade angle. This takes place in particular such that the first acceleration setpoint value is increased by a feedforwarding value, the feedforwarding value being determined in dependence on a differential angle as the difference between the blade angle at the time and the partial-load blade angle, in particular is determined proportionally thereto.

It should first be noted that, in the partial-load range, a constant partial-load blade angle should be set. In the transitional range to the full-load range, there may however be a deviation, to be specific due to the pitch control. This means also that the pitch control is already at least partially active. This is then taken into account by the differential angle which has therefore been set by the pitch control being taken into account.

This account is taken in the speed-power control in the determination of the acceleration setpoint value. Here it is particularly proposed that this is increased if such a differential angle has been established. In particular, it is increased all the more the greater this differential angle is, that is to say in absolute terms.

This increasing of the acceleration setpoint value has the consequence that the speed-power control attempts to correct this increased acceleration setpoint value, therefore attempts to reach this acceleration setpoint value by corresponding setting of the generator state variable, that is to say the generator power or the generator torque. As a result, the speed-power control may then however reach a limitation. This may also be referred to as it reaching saturation. This may then in turn mean that a smaller control reserve or no control reserve at all is detected. This control reserve or correspondingly smaller control reserve or non-existent control reserve may in a corresponding implementation have an effect on the pitch control and thereby activate it or increase its influence, possibly up to 100%, so that the speed-power control then no longer acts. As a result, the closed-loop speed-power control can be cut back in an easy way when the pitch control is active.

According to one aspect, it is proposed that a displacement of the characteristic curve is carried out, in which the operating characteristic is displaced in dependence on an operating point, in particular in dependence on a behavior of a pitch control, in particular in dependence on a set blade angle, such that, with the same rotational speed, a higher value of the generator state variable is set. In a representation of the operating characteristic with the rotational speed plotted on the x axis and the generator state variable, that is to say the generator power or the generator torque, plotted on the y axis, the operating characteristic is consequently displaced to the left.

The operating characteristic is intended for controlling the wind power installation in the partial-load range, but during the transition to the full-load range and when there is gusty wind the pitch control can respond, while the operating-characteristic control is likewise active. At such an operating point, the displacement of the operating characteristic is provided.

Here it has particularly been recognized that, when there is such gusty wind, the wind speed can fluctuate rapidly about an average wind speed. The pitch control is often not capable of correcting the rapid fluctuations, so that fluctuations in the rotational speed can result. In this case, the rotational speed may also fall below the rated speed, which may lead to a reaction of the operating-characteristic control, which to be specific reduces the power as the rotational speed falls. Since the operating characteristic is particularly steep for high rotational speeds, even small changes in speed can lead to great changes in power. If the rotational speed falls below the rated speed, that can lead to great reductions of the power, to be specific to values below the rated power, although the average rotational speed does not have to lie below the rated speed at all.

This is avoided by displacing the operating characteristic. It has been recognized that the situation described can be detected particularly from the behavior of the pitch control. It can particularly be deduced from the blade angle which is preset by the pitch control.

Therefore, it is proposed in particular that the operating characteristic is displaced by a predetermined or settable displacement speed, which lies in particular in a range from 0.3 to 1.5 rotations per minute (rpm), preferably in a range from 0.5 to 1 rpm. When there is a displacement by 1.5 rpm, it is consequently achieved that the rotational speed can fall by up to 1.5 rpm below the rated speed without the operating characteristic leading to a reduction of the power.

When there are low rotational speeds, such a displacement consequently has less effect; when there are high rotational speeds, if the operating characteristic is very steep, this however has a stronger effect. It also has the effect that, when there are high rotational speeds, close to the rated speed, the rated value of the generator state variable, that is to say the rated power or the rated torque, is already reached at a somewhat lower rotational speed than the rated speed. This can prevent the situation where a lower power than the rated power or a lower torque than the rated torque keeps being set when there is fluctuating wind speed, and correspondingly fluctuating rotational speed, in spite of there being a sufficiently high wind speed, to be specific in the region of the rated wind speed.

It is particularly proposed that the displacement of the characteristic curve is carried out in dependence on an exceedance of the partial-load blade angle, in particular in dependence on an exceedance value by which the blade angle exceeds the partial-load angle.

As long as the blade angle has the partial-load angle, the pitch control has not yet become active. If it is exceeded, it has become active and a displacement of the characteristic curve comes into consideration. When there are small exceedances of the partial-load angle, for example of only 1°, it is not yet necessary however to assume great gustiness. Therefore, the displacement of the characteristic curve is made dependent on an exceedance value.

The displacement of the characteristic curve is particularly only carried out whenever the exceedances value reaches an exceedance minimum value, which in particular lies in the range from 2° to 5°.

It may additionally or alternatively be provided that the exceedance value is quantitatively evaluated, and the displacement speed is set dependent on the exceedance value.

The exceedance value consequently makes an evaluation of the gustiness possible and, dependent on it, the displacement speed can be correspondingly chosen, to be specific all the greater the greater the exceedance value is.

Also proposed is a wind power installation. Such a wind power installation has an aerodynamic rotor, which is operated with variable rotational speed and which has rotor blades that are adjustable in their blade angle. The wind power installation also has an open-loop control device for controlling the wind power installation. The open-loop control device is prepared to control the wind power installation by means of a method for controlling the wind power installation according to at least one of the embodiments described above.

This means particularly that the open-loop control device may have at least one process computer on which the method is implemented. In particular, one or more operating characteristics are stored for this and an operating-characteristic control is implemented, taking in dependence on the detected rotational speed a corresponding generator state variable from the relevant operating characteristic and correspondingly setting the wind power installation.

The open-loop control device particularly has access to the generator of the wind power installation and can set its power output and/or its generator torque. The open-loop control device also has access to adjusting devices for adjusting the blade angles of the rotor blades.

Also implemented in the open-loop control device is a speed-power control and this can receive actual values and likewise activate the generator and the blade adjusting device.

In particular, the speed-power control is implemented such that it can receive both a speed actual value and a speed setpoint value and that it can also receive an acceleration actual value or can calculate it from a received speed.

Also proposed is a wind farm, which has a number of wind power installations.

One or more or all of these wind power installations are formed as wind power installations according to at least one embodiment described above. Particularly because a number of the wind power installations or even all of the wind power installations of the wind farm use at least one method described above for controlling the wind power installation, their operation can be coordinated with one another. At the same time it has to be particularly noted that any oscillating behaviors of the wind power installations can also make the wind power installations affect one another. As a result, better suppression of such oscillations as a result of the proposed methods and more stable behavior of the wind power installations as a result of at least one of the methods proposed above lead to favorable overall behavior of the wind farm. In particular, a wind farm is an arrangement of wind power installations that feed into the electricity supply grid via the same grid connection point. The proposed methods also allow this feeding in to take place more uniformly and with fewer oscillations.

BRIEF DESCRIPTION OF THE SEVERAL VIEWS OF THE DRAWINGS

The invention is now described in more detail below by way of example with reference to the accompanying figures.

DETAILED DESCRIPTION

Figure 1:
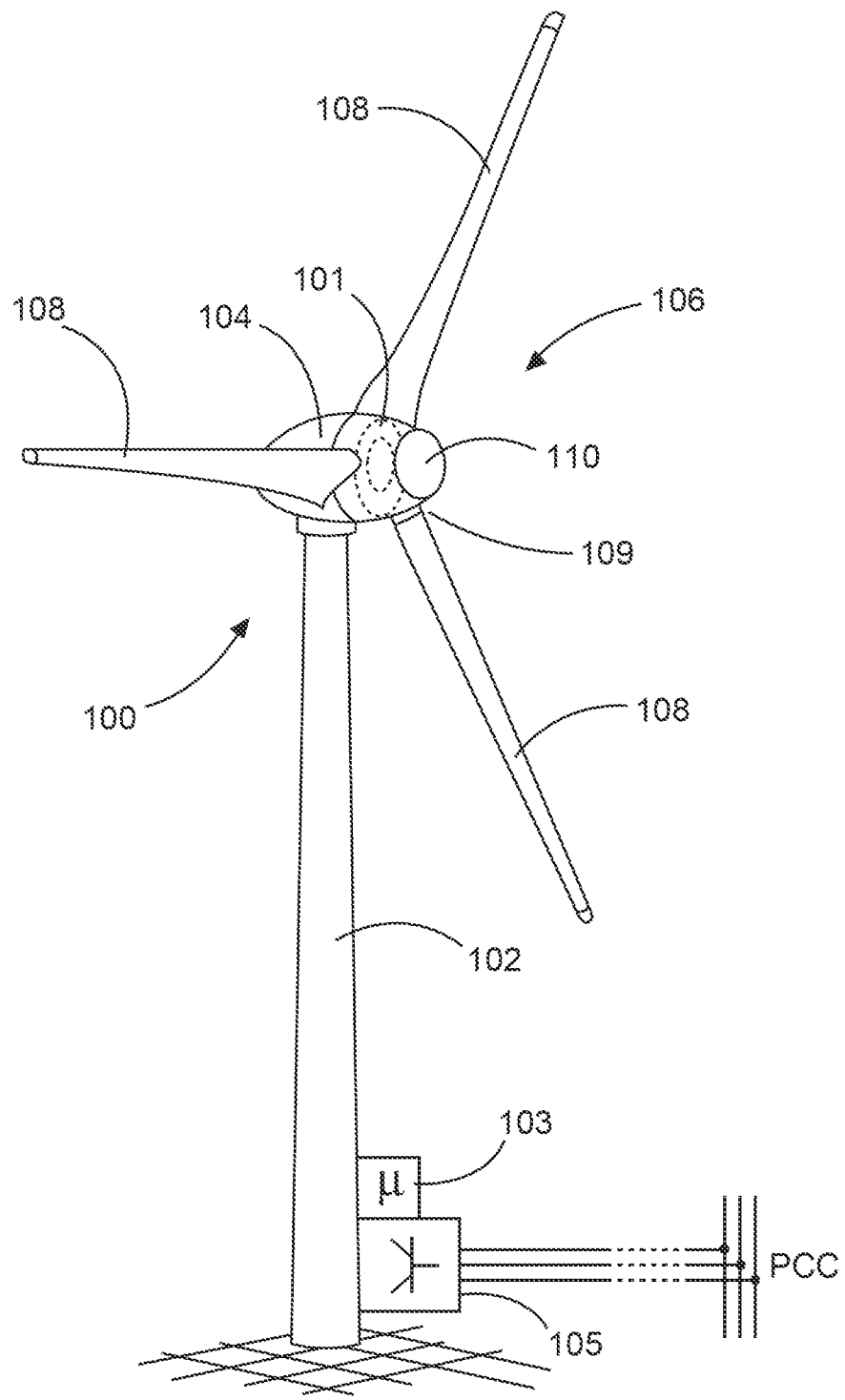
FIG. 1 shows a wind power installation in a perspective representation.

FIG. 1 shows a schematic representation of a wind power installation. The wind power installation 100 has a tower 102 and a nacelle 104 on the tower 102. Provided on the nacelle 104 is an aerodynamic rotor 106 with three rotor blades 108 and a spinner 110. During the operation of the wind power installation, the aerodynamic rotor 106 is set in a rotary motion by the wind, and thereby also turns an electrodynamic rotor of a generator that is directly or indirectly coupled to the aerodynamic rotor 106. The electrical generator is arranged in the nacelle 104 and generates electrical energy. The pitch angles of the rotor blades 108 can be adjusted by pitch motors at the rotor blade roots 108b of the respective rotor blades 108.

The wind power installation 100 has in this case an electrical generator 101, which is indicated in the nacelle 104. By means of the generator 101, electrical power can be generated. For feeding in electrical power, a feeding-in unit 105 is provided, which may particularly be formed as an inverter. Consequently, a three-phase feed-in current and/or a three-phase feed-in voltage with respect to amplitude, frequency and phase can be generated, for feeding in at a grid connection point PCC. This may take place directly or together with further wind power installations in a wind farm. For controlling the wind power installation 100 and also the feeding-in unit 105, an open-loop installation controller 103 is provided. The installation controller 103 may also receive preset default values from outside, in particular from a central farm computer.

Figure 2:
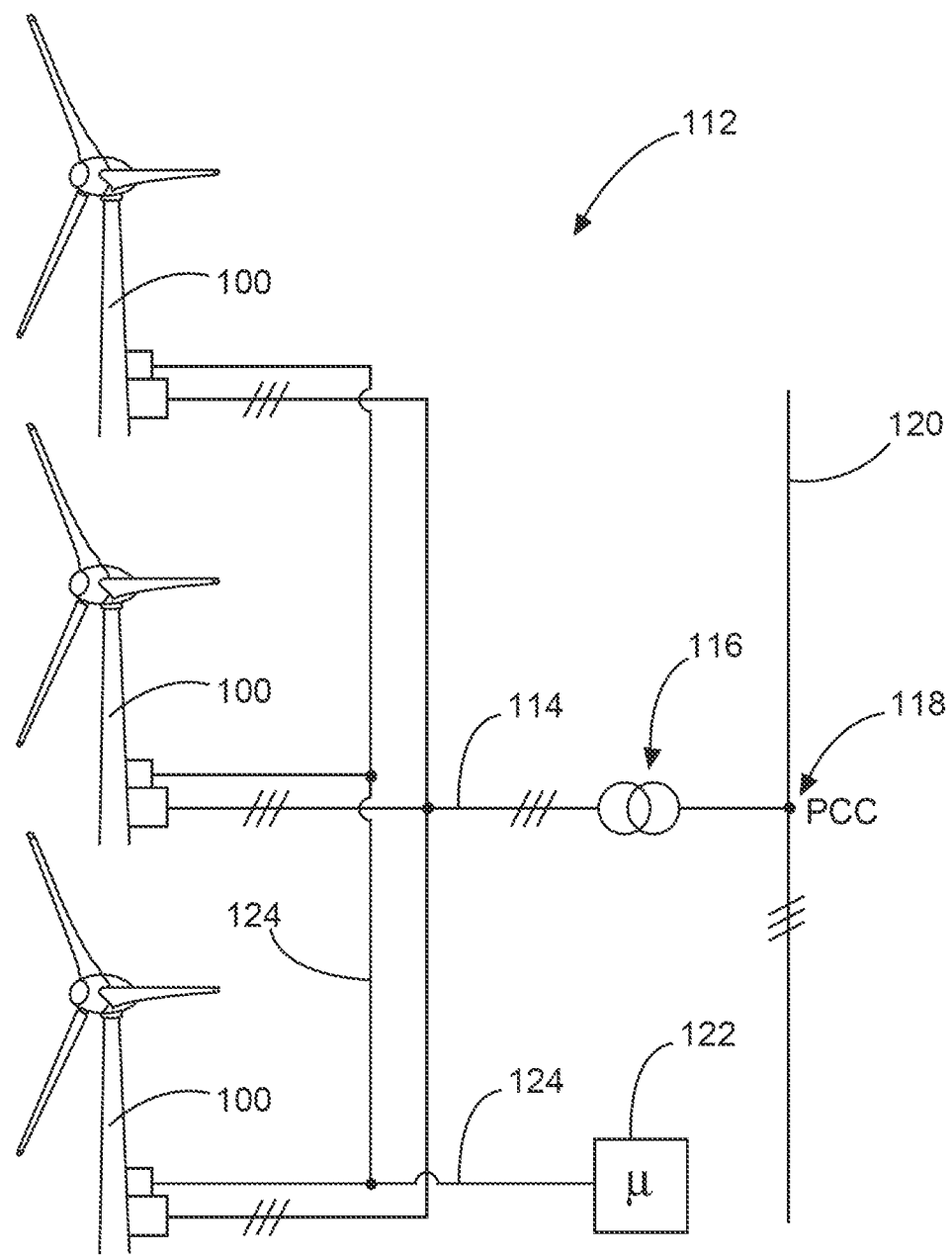
FIG. 2 shows a wind farm in a schematic representation.

FIG. 2 shows a wind farm 112 with, by way of example, three wind power installations 100, which may be the same or different. The three wind power installations 100 are consequently representative of essentially any number of wind power installations of a wind farm 112. The wind power installations 100 provide their power, to be specific in particular the electricity generated, by way of an electrical farm grid 114. In this case, the electricity or power respectively generated by the individual wind power installations 100 is added together and there is usually a transformer 116, which steps up the voltage in the farm in order then to feed into the supply grid 120 at the feed-in point 118, which is also referred to generally as the PCC. FIG. 2 is just a simplified representation of a wind farm 112, which for example does not show any controller, although there is of course a controller. It is also possible for example for the farm grid 114 to be differently designed, in that for example there is also a transformer at the output of each wind power installation 100, to name just one other exemplary embodiment.

The wind farm 112 also has a central farm computer 122. This may be connected to the wind power installations 100 by way of data lines 124, or wirelessly, in order thereby to exchange data with the wind power installations and in particular to receive measured values from the wind power installations 100 and transmit control values to the wind power installations 100.

Figure 3:
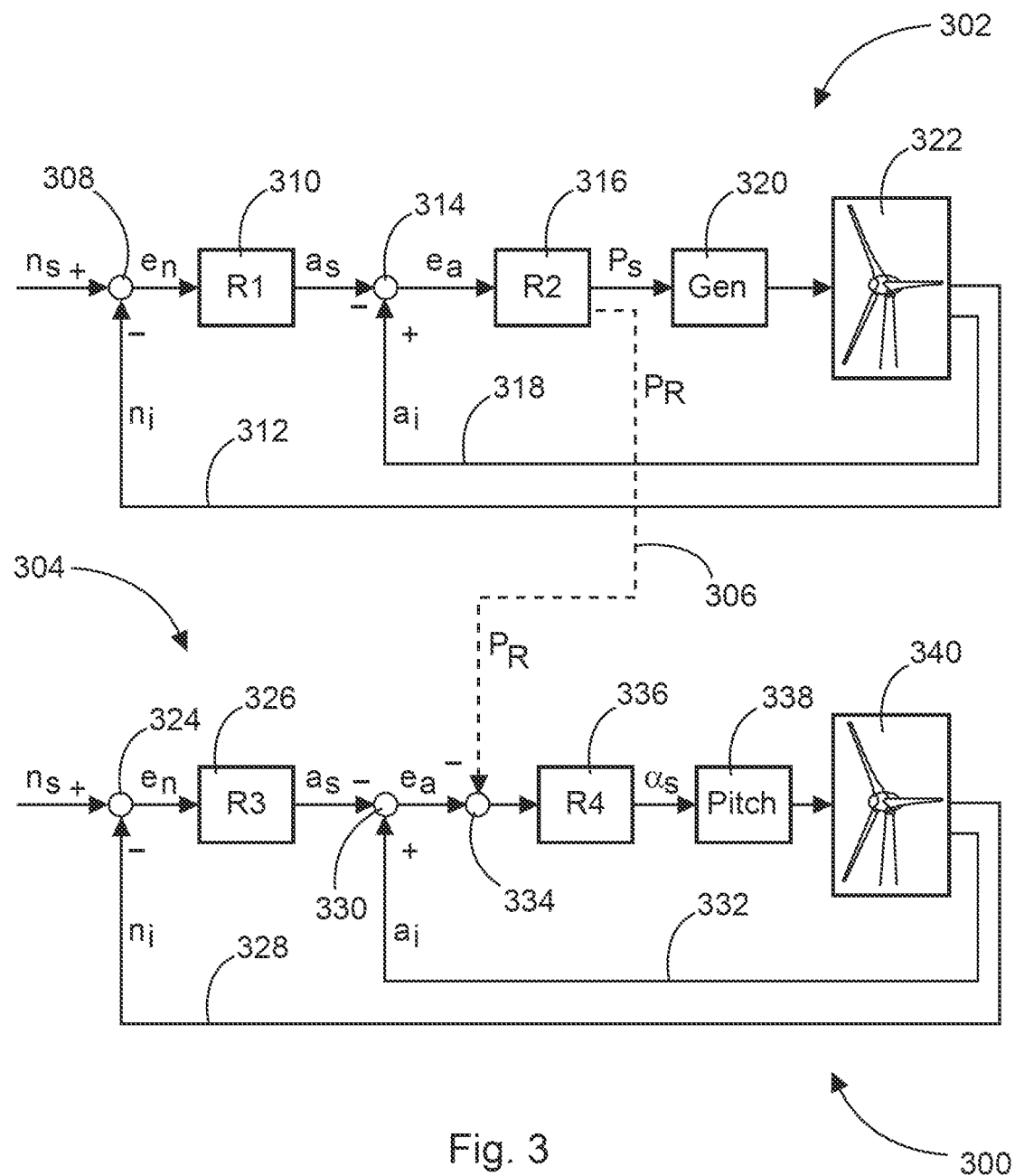
FIG. 3 shows a speed-power control and a pitch control respectively in a simplified schematic representation.

FIG. 3 shows a simplified controlling structure (e.g., control system) 300. It has in its upper part a speed-power control 302. In the lower part, it has a pitch control 304. The speed-power control 302 and the pitch control 304 may be coupled by way of a coupling connection 306, which is represented by dashed lines and is further explained below. In principle, however, both closed-loop controllers can operate independently of one another, so that the coupling connection 306 is only represented by dashed lines. It is provided at least according to one embodiment.

The speed-power control 302 has a first summing point 308, at which a setpoint/actual-value comparison between the setpoint speed ns and the actual speed $n_i$ is carried out. The resulting control error $e_n$ is entered into the first controller 310. The actual speed $n_i$ is detected at the wind power installation and fed back via an outer feedback 312 and is sent to the first summing point 308. The first summing point 308, the first controller 310 and the outer feedback 312 may be regarded as essential component parts of an outer cascade of the speed-power controller.

The first controller 310 determines on the basis of the control error $e_n$ a first acceleration setpoint value as. This is subtracted from an acceleration actual value $a_i$ at the second summing point 314, so that the inner control error $e_a$ is obtained. Consequently, a setpoint/actual-value comparison with a negative sign takes place at the second summing point. It is essentially only a question of nomenclature and should, in illustrative terms, be attributed to the fact that, in the case of a generator, a generator torque with a braking effect, therefore counteracting an acceleration, is controlled. That is the reason for the chosen signs at the second summing point 314.

The resulting inner control error $e_a$ is sent to the second controller 316, which determines from it a generator setpoint value, which may be formed as a generator setpoint torque or, as in the variant shown in FIG. 3, as a power setpoint value $P_s$. The acceleration actual value $a_i$ is fed back to the second summing point 314 by an inner feedback 318. The second summing point 314, the second controller 316 and the inner feedback 318 may be regarded as essential elements of the inner cascade of the speed-power controller 302.

The acceleration values considered, that is to say the detected acceleration value $a_i$ and the preset acceleration value as, are preferably taken into account as power values. In this case, an acceleration power, which is used as a value of the corresponding acceleration value, describes how much power has to be used up to achieve the corresponding acceleration, or how much power would be output by corresponding braking.

It is nevertheless required to convert into the power setpoint value $P_s$ from the inner system deviation $e_a$, even if it is already a power on the basis of its physical unit, by the second controller 316. Further details of this are described below.

In any event, the power setpoint value $P_s$ thus determined is entered into the generator 320 and that has an effect on the wind power installation illustrated in the wind power installation block 322. The representation of the generator 320 as a block of its own serves substantially for purposes of illustration. In fact, the generator 320 is of course part of the wind power installation. Particularly, however, it is intended that this should illustrate the delimitation of the pitch control 304.

During the operation of the wind power installation, it can consequently be operated according to an open-loop operating-characteristic control. However, at specific rotational speeds or speed ranges, which is further explained below, the closed-loop speed-power control 302 shown is provided. If this is activated, it consequently receives a corresponding speed setpoint value. That may be fixed or part of a special characteristic curve.

In the case that is best suited for purposes of illustration, there is a constant speed setpoint value ns. Due to fluctuations of the wind speed, the actual rotational speed fluctuates and an outer control error $e_n$ is obtained at the first summing point 308.

The first controller 310 has the effect that the outer control error then leads to an acceleration setpoint value as. This acceleration setpoint value is not however converted into a generator power or a generator torque directly, but instead it is first checked how great a difference there is at all from an existing acceleration value. This produces the inner control error $e_a$, from which then the power setpoint value $P_s$ is determined by means of the second controller 316 and is sent to the generator 320. As a result, the acceleration of the rotor is correspondingly changed and as a result the rotational speed is corrected to the preset rotational speed.

If, therefore, a closed-loop speed control is to be carried out in the partial-load range, this speed-power control 302 is used. The rotational speed is thereby controlled and this also results in a corresponding output power of the generator, which is not only used for closed-loop control but is also output as power generated from the wind. This speed-power control may be provided independently of the pitch control 304, particularly whenever this speed-power control 302 is used to control an upper or lower avoidance speed in a speed avoidance range. Particularly for rotational speeds below an upper speed range, that is to say not close to the rated speed, the speed-power control 302 manages without linking up with the pitch control 304, which to be specific is in that case still inactive.

However, linking up with the pitch control 304 particularly comes into consideration in an upper speed range. The pitch control 304 is constructed similarly to the speed-power control 302. The pitch control 304 also has an outer cascade, which has a third summing point 324, at which a setpoint/actual-value comparison of the rotational speeds is carried out in order to produce an outer control error $e_n$ and send it to the third controller 326. An outer feedback 328 is also provided for the actual speed $n_i$.

The third controller 326 then produces an acceleration setpoint value as, which is compared with the actual acceleration $a_i$ at the fourth summing point 330. The actual acceleration $a_i$ is in this case fed by way of the inner feedback 332 to the fourth summing point 330. An inner control error $e_a$ is obtained.

The fifth summing point 334 may be inactive and is only required for the coordination of the speed-power control 302 and the pitch control 304. If this fifth summing point 334 is inactive, the inner control error $e_a$ is sent directly to the fourth controller 336. To this extent, the structure still corresponds, at least essentially, to the speed-power control 302, for which reason some designations are also chosen to be identical.

However, the fourth controller 336 then produces a setpoint value for the blade angles $\alpha_s$, which is correspondingly sent to a pitch system 338. The blades are therefore adjusted by means of the pitch system 338 such that the acceleration actual value is adjusted to the acceleration setpoint value, in order thereby also to achieve an adjustment of the actual speed to the setpoint speed. To this extent, the pitch system acts on the wind power installation block 340, which could correspond to the wind power installation block 322. Here, too, the pitch system 338 is of course part of the wind power installation and moreover the entire closed-loop control may also be regarded as part of the wind power installation. To this extent, here, too, the wind power installation block 340 serves for purposes of illustration, to be specific that the pitch system 338 acts on the wind power installation. Consequently, the pitch control acts on the wind power installation by presetting the setpoint angle as.

In spite of similar structures of the speed-power control 302 and the pitch control 304, the two controls however use different manipulated variables. The speed-power control 302 uses a generator power or a generator torque as a manipulated variable, whereas the pitch control 304 uses a blade adjustment as a manipulated variable. This is of course also taken into account in the corresponding closed-loop controllers, in particular in the second and fourth controllers 316, 336.

The two structures are however chosen similarly to the extent that the setpoint/actual-value comparison in the second summing element 314 and in the fourth summing element 330 can be the same to the extent that they can be based on the same physical unit for the acceleration. It is particularly proposed that in both cases the acceleration values are regarded as powers. As a result, coupling or coordination of the speed-power control 302 with the pitch control 304 becomes possible.

The second controller 316 determines for this a control reserve $P_R$ and outputs it. The control reserve $P_R$ indicates how much power is available to the speed-power control 302 for closed-loop control. If, for example, the wind power installation is already outputting maximum power, the reserve power would be zero, to give an extreme case. At the fifth summing point 334 there would then be the value zero, that is to say the pitch control changes nothing at all. The pitch control would then quite normally adjust the rotor blades appropriately out of the wind to reduce the rotor acceleration. At the same time, the speed-power control 302 would not be able to bring about any change because its manipulated variable, to be specific the generator power (which could also be the generator torque), is already at a limit, which may also be referred to as saturation. In this case, in fact only the pitch control 304 would still be active, and would be 100% active, whereas the speed-power control 302 would no longer be active. However, that could quickly change again, for example when the wind drops.

If, however, there is a control reserve, this is subtracted from the setpoint/actual-value difference at the fifth summing point 334. This inner control error $e_a$ is consequently the rotor acceleration that remains after the setpoint/actual-value comparison and would have to be corrected. For this purpose, it is entered into the fourth controller 336. If, however, the speed-power control 302 still has sufficient control reserve available, this is subtracted from the acceleration to be corrected. In extreme case, this may mean that it is subtracted down to zero. In this extreme case, only the speed-power control 302 would be active, but the pitch control 304 would not.

It may of course also be the case that the control reserve $P_R$ is much greater than the output of the fourth summing point 330. The output of the fifth summing point 334 would then become negative. On account of limitations, this would nevertheless not lead to a blade angle or blade angle adjustment in the other direction. Here it must particularly be taken into account that the speed-power control 302 and the pitch control 304 may operate in an overlapping manner, in particular in the transitional range from the partial-load range to the full-load range. Right at the beginning of the full-load range, the rotor blades are however still optimally in the wind. The pitch control can then only turn the rotor blades in one direction. A negative output value at the fifth summing point 334 would in that case not lead to any effect. On the other hand, if the rotor blades had however already been turned somewhat out of the wind, a negative output value at the fifth summing point 334 would have the effect that the blades are again turned fully into the wind.

These were just some illustrative examples to explain the basic principle. The detailed control steps may of course depend on further details, including integral components (e.g., integration capability), particularly in the second controller.

Figure 4:
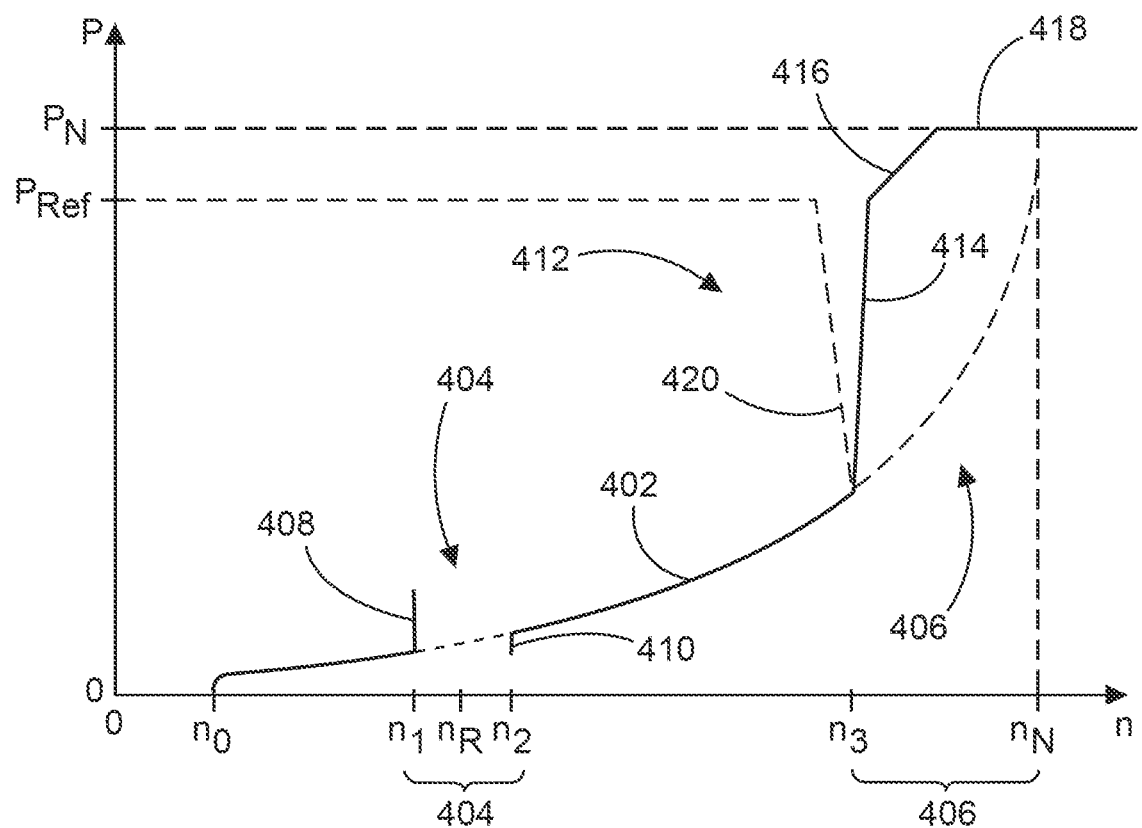
FIG. 4 shows a speed-power diagram to illustrate the proposed control method.

FIG. 4 shows a speed-power diagram, in which the generator power P is plotted against the rotational speed n of the rotor. Shown here, beginning with the starting speed no, is a speed-power characteristic, which rises in a strictly monotonously increasing manner until reaching the rated speed $n_N$ with rated power $P_N$ and forms an operating characteristic 402. This operating characteristic is interrupted in a speed avoidance range 404, which is indicated there by the dotted line. It is also proposed likewise not to use the operating characteristic for controlling the wind power installation in an upper speed range 406, so that there it is only represented by dashed lines.

The speed avoidance range 404 essentially includes a point of resonance. At this point of resonance, a resonant frequency of the wind power installation may be excited by the plotted resonance speed $n_R$. Therefore, as far as possible, the wind power installation should not be operated at this speed.

When there is increasing wind speed, consequently the rotational speed gradually increases according to the operating characteristic 402, beginning from the starting speed no, according to the increase in the wind speed. Depending on which rotational speed is adopted, an assigned power is set according to the operating characteristic 402.

If the rotational speed reaches the lower avoidance speed $n_1$, a speed-power control is switched on, as it is shown as speed-power control 302 in FIG. 3. The coupling connection 306 is not relevant here and can either be omitted or does not have any effect. If then the wind speed increases further, this would lead to an increase of the rotational speed, but would then be counteracted by the speed-power control. It operates as explained in connection with FIG. 3, with the lower avoidance speed $n_1$ able to be entered as the setpoint speed ns, then therefore sent to the first summing point 308.

As a result, the power increases, in order thereby to counteract the acceleration of the rotor. This can be realized particularly well by the proposed cascade control, which determines an acceleration setpoint value in the outer cascade and corrects it in the inner cascade. This produces the left branch 408 shown. The greater the wind speed then becomes, the higher this vertical branch 408 rises up.

In may then be envisaged to change from the left branch 408 to the right branch 410 at the upper avoidance speed $n_2$. If the wind speed then increases further, the operating point moves further up on the right branch 410, until the operating characteristic 402 is reached. If the wind speed then increases still further, the operating point moves further on the operating characteristic 402 in the direction of higher speeds and also higher power.

Changing from the left branch to the right branch, or vice versa when the wind speed is falling, may depend on limit values. It is particularly proposed that a change is made from the left branch 408 to the right branch 410 if the generator state variable, here therefore the power P, has reached an upper limit value. Conversely, changing may be envisaged, particularly when wind speeds are falling, if the installation is being operated with an operating point on the right branch 410 and reaches a lower power limit. It may particularly be envisaged that a change must therefore be made if the upper limit is reached on the left branch or the lower limit is reached on the right branch.

It may however be provided that there is also the possibility of changing before this. For this, an aerodynamic efficiency of the operating point at the time may be determined. This particularly depends on the tip speed ratio, that is to say on the quotient of a blade tip speed divided by the wind speed at the time. In the partial-load range, the wind power installation is usually designed such that the tip speed ratio is as far as possible ideal. This design usually leads to the operating characteristic used, here therefore the operating characteristic 402. If the operating point lies on this operating characteristic 402, it is aerodynamically optimum. An optimum aerodynamic efficiency is therefore obtained.

If then the rotational speed is kept for example at the lower avoidance speed $n_1$, the power increasing according to the left branch 408, a departure is made from this operating characteristic 402, and consequently also from aerodynamically optimum operation. The aerodynamic efficiency therefore drops. It can also be calculated, since a characteristic diagram of the wind power installation, and consequently the efficiencies of various operating points of a wind power installation, is/are usually well known. The efficiency can be derived from the speed detected and the power generated and this can also be used to derive the wind speed, by way of the known characteristic diagram.

If the wind speed has been derived, it can also be calculated which operating point the wind power installation would adopt after a change to the right branch 410. This can also be carried out by using the known characteristic diagram, from which the aerodynamic efficiency can then be calculated, and consequently the aerodynamic efficiencies of the operating point at the time, that is to say according to the example given on the left branch 408, can be compared with the efficiency of the operating point on the right branch 410, which the wind power installation would adopt after a change. If the efficiency of the operating point that has been calculated for after a change is higher than the aerodynamic efficiency at the time, a change comes into consideration. However, the change does not have to be carried out immediately, if for example, to keep with the above example, the difference between the two efficiencies is small and it is not yet foreseeable whether the wind speed will increase further.

If, when the wind speed is falling, an operating point moves as it were down to the upper avoidance speed $n_2$ from above, the method may be applied analogously for changing from the right branch 410 to the left branch 408.

Figure 5:
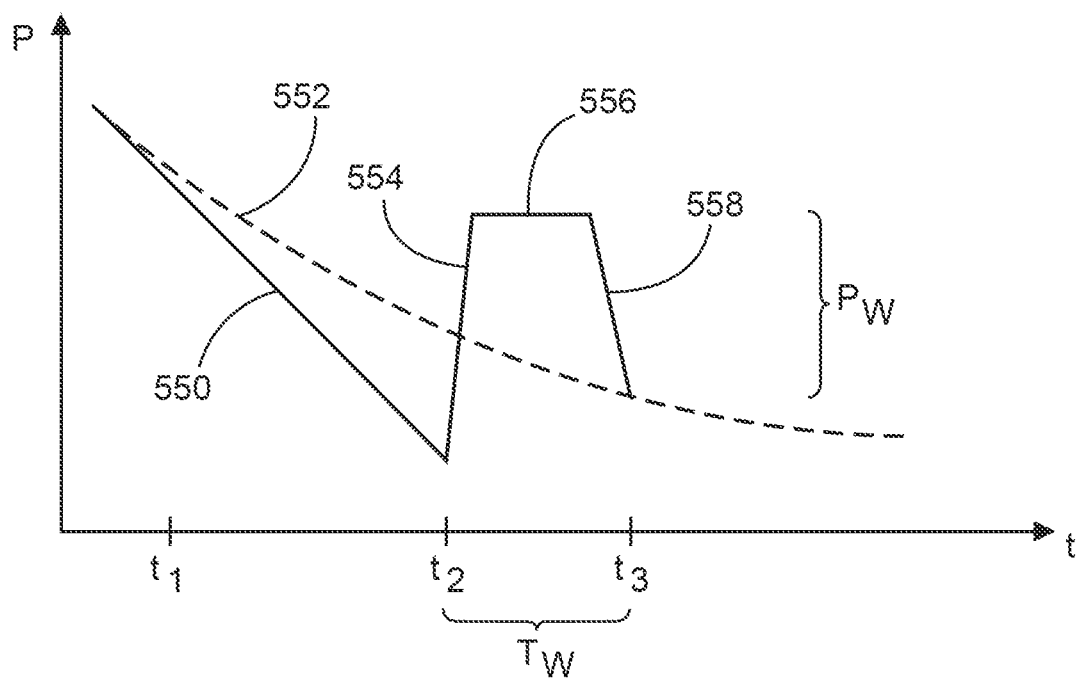
FIG. 5 shows a time-power diagram to illustrate a transition between an upper operating point and a lower operating point.

The changing process may be carried out as it is described in FIG. 5. FIG. 5 is an illustration of a change on the basis of an example in which the wind speed is falling, and consequently the power P that can be generated is falling. This is schematically illustrated by the strictly monotonously falling dashed line. It is assumed that, at the point in time $t_1$, the upper avoidance speed $n_2$ is reached, coming from above. Then the speed-power control commences and attempts to keep the speed at the upper avoidance speed $n_2$. That leads to the power decreasing, which is indicated by the power control branch 550. The dashed power progression 552 consequently lies above the power control branch 550. As a result, less power is converted, whereby the rotor is braked less or is no longer braked. The rotational speed can be maintained.

At the starting point in time $t_2$, to be specific for starting a changing process, the power has fallen so far that it has either already reached a lower limit value or the aerodynamic efficiency of the operating point has in the meantime become so bad that a change is expedient. Essentially, the power control branch 550, which however does not by any means have to run linearly, corresponds to the right branch 410 of FIG. 4. In FIG. 4, the power decrease is however shown against the rotational speed n, so that the right branch runs vertically. In FIG. 5, the progression of the power control branch 550 is however shown against time, so that it does not run vertically.

If a change is then initiated, the power increases strongly, as can be seen in the rising branch 554 of the progression over time shown. A further upper branch 556 and a falling branch 558 form together with the rising branch 554 a progression over time for the generator state variable to be set, to be specific here the power to be set.

At the post-change point in time $t_3$, the change has been completed, so that the operating point is then on the left branch 408 but is at the foot of the left branch 408, since in the representation of FIG. 5 the falling branch 558 ends on the dashed power progression 552. The power that can be generated as an optimum is then therefore output, so that therefore the optimum operating point has been set, once again lying on the operating characteristic. However, the optimum operating point, which may also be referred to synonymously as the working point, does not have to be achieved when making a change.

Here, particularly the differential time between the starting point in time $t_2$ and the post-change point in time $t_3$ may be referred to as the change time $T_w$ and preset. The distance between the power level of the upper branch 556 and the power achieved after the change may be referred to as the change power $P_w$. The rising branch 554, the upper branch 556 and the falling branch 558 approximately form a trapezoid and, for simplicity, the product of the change time $T_w$ and the change power $P_w$ can be used for calculating the change energy. To take into account the inclinations of the rising branch 554 and the falling branch 558, instead of the difference between the starting point in time $t_2$ and the post-change point in time $t_3$, the time that one of the two flanks needs, that is to say for example the time the falling branch 558 needs to fall from the upper branch 556 to the dashed power progression 552, is subtracted as the change time $T_w$.

By analogy, when the wind speed is increasing, a change can be made from the left branch 408 to the right branch 410, by the power falling under the ideal power progression, in order thereby to allow an acceleration of the rotor.

In FIG. 4, the use of a closed-loop speed-power control for the upper speed range 406 is also explained. It is accordingly envisaged that, from the transitional speed $n_3$, the speed-power control is used, as it is explained in FIG. 3. Particularly, here, too, the coupling between the speed-power control 302 and the pitch control 304 by means of the coupling connection 306 may be provided.

For this purpose, it is proposed that the speed-power control receives as a speed setpoint value a speed according to a transitional speed characteristic. Such a transitional speed characteristic 412 has a vertical branch 414 and a residual branch 416, which adjoins the vertical branch 414. The residual branch 416 is adjoined by a horizontal branch 418, which has rated power $P_N$ and reaches up to the rated speed $n_N$ and may reach beyond that. The horizontal branch 418 may also be regarded as part of the transitional speed characteristic 412.

The vertical branch 414 consequently has the effect that, when the wind speed is increasing, at first the transitional speed $n_3$ forms the setpoint speed for the speed-power control. If in this case, with increasing wind speed, the power reaches a reference power value $P_{ref}$, which lies below the rated power $P_N$, the residual branch 416 is used. The residual branch 416 is intended to lead the operating point finally up to the rated power $P_N$ when the wind speed is increasing. The rated power $P_N$ is in this case intended to be preferably reached before the rated speed $n_N$ has been reached.

In this respect, the residual branch 416 may have a positive slope and, as shown in FIG. 4, be formed as straight. According to the residual branch 416, the power then increases proportionally with increasing rotational speed. However, other progressions are also conceivable, for example according to a second-order polynomial, so that the residual branch 416 may then be curved, in order thereby to achieve the rated power $P_N$.

In any event, such a residual branch 416 reproduces a relationship between rotational speed and power. This relationship may be used such that the operating point is identified on the basis of the output power and the associated rotational speed is then entered into the speed-power controller as the setpoint speed. As a result, the wind power installation can then also be guided along this residual branch 416 by means of the speed-power control.

Alternatively, a negative slope may also be provided for the vertical branch 414, so that the rotational speed decreases somewhat with increasing power. This is indicated by the alternative branch 420, which is represented by dashed lines. Its slope may be in absolute terms up to 10%, and accordingly the rotational speed falls by up to 10% of the rated speed when the power increases by the rated power. This maximum slope in absolute terms of 10% therefore concerns the changing of the rotational speed in relation to the changing of the power, respectively on the basis of the rated speed and rated power. The closed-loop control of the alternative branch 420 may also take place by the power being detected and, dependent on it, the rotational speed assigned to the alternative branch 420 being used as the setpoint speed for the speed-power control.

Particularly in the region of the residual branch 416, it comes into consideration that the speed-power control, as it is explained above in FIG. 3, no longer has a sufficient power reserve. Correspondingly, again with reference to FIG. 3, the coupling connection 306 will transfer to the pitch control 304 a correspondingly small value which is taken into consideration there at the fifth summing point 334. Correspondingly, the pitch control 304 may then already become active.

Figure 6:
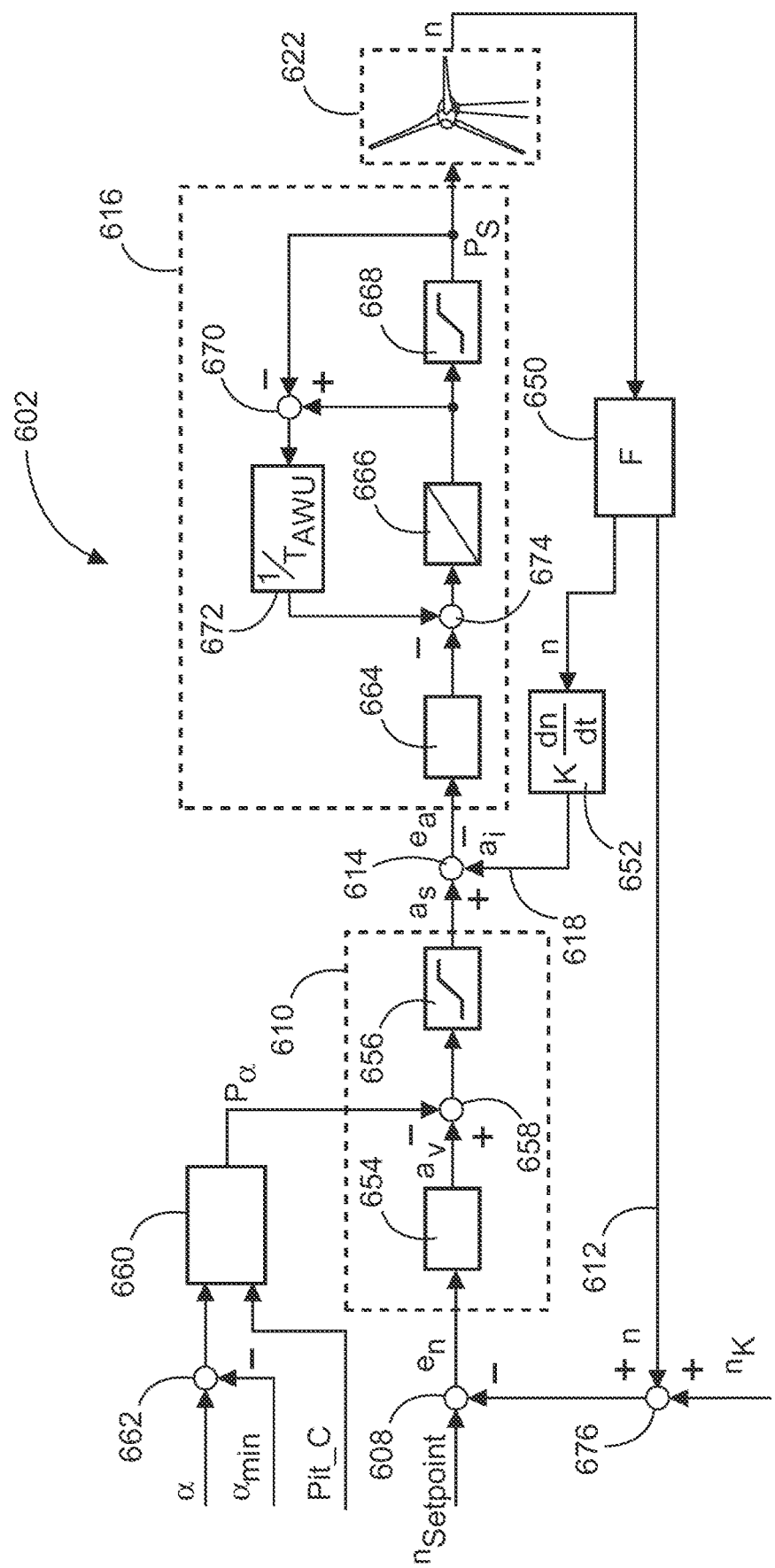
FIG. 6 shows a speed-power control in an extended structure compared to FIG. 3.

FIG. 6 shows a speed-power control corresponding to the upper part of FIG. 3, but with further elements, partly with more details and partly in a somewhat different representation. In any event, the speed-power control 602 of FIG. 6 also has a first summing point (e.g., adder/subtractor) 608, which essentially performs a setpoint/actual-value comparison for the rotational speed and consequently produces an outer control error $e_n$ for the speed. This is entered into a first closed-loop controller 610, which here however has further details and is therefore only represented as a dashed block. The first controller 610 likewise outputs a setpoint acceleration $a_s$. In this respect, a setpoint/actual-value comparison takes place at the second summing point (e.g., adder/subtractor) 614 and that is entered into a second controller 616. The latter in turn outputs a setpoint generator state variable, to be specific here a setpoint power $P_S$. An outer feedback 612 and an inner feedback 618 are likewise provided.

To this extent, the function also corresponds to the way of functioning explained in relation to FIG. 3 for the speed-power control 302. The setpoint power $P_S$ output from the second controller 616 is in this case sent to the wind power installation 622, which here however includes the generator. Furthermore, the wind power installation 622 outputs a speed n and this is sent via a filter block (e.g., filter or filter circuit) 650. The filter block 650 consequently outputs two filtered speeds, it being possible for the filterings to take different forms. For the inner feedback 618, the speed is converted inter alia by derivation in the acceleration block (e.g., acceleration circuit) 652 into the detected acceleration Such a differentiation is not provided in the outer feedback 612 and it may therefore be advisable that the filter block 650 is filtered differently for the inner feedback 618 than for the outer feedback 612.

The first controller 610 is constructed such that the speed control error is converted in the speed converting block (e.g., speed converting circuit) 654 into a preliminary acceleration value $a_v$. That is converted by way of an acceleration limiting block (e.g., acceleration limiting circuit) 656 into the acceleration setpoint value as. The provisional acceleration value $a_v$ is already provided as power. An equivalent blade angle power $P_\alpha$ can be subtracted from it, to be specific at the third summing point 658 (e.g., adder/subtractor). The equivalent blade angle power $P_\alpha$ is determined by the blade angle power block (e.g., blade angle power circuit) 660. In the blade angle power block 660, the difference between an existing blade angle $\alpha$ and a minimum blade angle $\alpha_{min}$ is taken into account with the aid of the fourth summing point (e.g., adder/subtractor) 662. Furthermore, information concerning the pitch control Pit_C at the time is taken into account.

This difference between the blade angle at the time and the minimum blade angle is what particularly matters. If the blade angle $\alpha$ at the time corresponds to the minimum blade angle $\alpha_{min}$, the difference is zero and no account has to be taken. The output value of the blade angle power block 660, that is to say the equivalent blade angle power Pa, may then be zero. However, once the blade angle has been adjusted with respect to the minimum blade angle, this means that the taking of power is no longer optimal, in particular that it has been reduced, to be specific by this equivalent blade angle power value $P_\alpha$. That is consequently taken into account at the third summing point 658 in the first controller 610. The provisional acceleration $a_v$, which to be specific is intended to lead to the setpoint acceleration $a_s$, can consequently be reduced.

The stronger this feedforwarding is chosen to be, the greater the extent to which the described speed control by means of the generator power is decoupled from the pitch control.

In particular operating situations, in which exceeding of the minimum blade angle is natural, such as for instance during the operation of starting the installation, a deactivation of the described feedforwarding is proposed.

Therefore, the provisional acceleration value $a_v$ is correspondingly modified and the result is additionally sent via the acceleration limiting block 656, so that the acceleration setpoint value as is obtained.

The setpoint/actual-value comparison of the acceleration values then leads to the inner control error $e_a$, which in the second controller 616 is entered into the acceleration converting block (e.g., acceleration converting circuit) 664. Particularly taken into account in the acceleration converting block 664 is a time constant, which can be referred to as the readjustment time. The result is then sent to the integrator 666. The output of the integrator 666 is essentially the setpoint power $P_s$ to be determined, this initially also being sent via a power limiting block (e.g., power limiting circuit) 668, in order to take limitations into account.

To avoid the integrator 666 being integrated any further, although a limitation has already been reached in the power limiting block 668, a comparison between the unlimited power and the limited power takes place at the fifth summing point (e.g., adder/subtractor) 670. If the limitation in the power limiting block 668 is not reached, the result of forming the difference at the fifth summing point 670 has the value zero. If, however, the limitation is reached, the difference is fed back via the integrator limiting block 672 to the input of the integrator 666 by being subtracted from the result of the acceleration converting block 664 at the sixth summing point (e.g., adder/subtractor) 674.

Furthermore, a displacement of the characteristic curve is provided in the speed-power control 602 of FIG. 6. The speed-power characteristic may in this case be displaced by the speed displacement value $n_k$ for the account to be taken in the speed power control. For this, the speed displacement value $n_k$ is added to the speed actual value at the seventh summing point (e.g., adder/subtractor) 676. The speed displacement value $n_k$ may be for example 0.3 to 1.5 rpm. This value is added to the measured or detected speed n and this has the effect that, from the viewpoint of the speed-power controller, the actual speed is somewhat greater than it actually is. That leads to the effect that the operating characteristic, that is to say the speed-power characteristic, is displaced to the left by the corresponding value of the displacement speed $n_k$.

The activation of the displacement and also its magnitude may in this case depend on a set blade angle, and consequently on a behavior of a pitch control, such as for example the pitch control 304 of FIG. 3. According to the pitch control, the setpoint value for the blade angles $\alpha_s$ may be used as a criterion of the displacement. As a result, it can be achieved that, when there is gustiness, a fall in rotational speed does not lead to a reduction of the power if this fall in rotational speed lies below the rated speed by less than the displacement speed.

Provided herein is controlling the rotational speed of the wind power installation in the partial-load range, i.e., as long as the speed is largely controlled by the installation power or the generator torque, and not yet primarily by the blade angles.

An improvement of the power curve of a wind power installation and a circumvention of speeds can particularly be achieved, especially to avoid operation at points of resonance. An avoidance of loads and tonality can in this way be achieved, to give just two examples.

In particular, the following is proposed:

A cascaded controlling structure is proposed, with an outer loop for a closed-loop speed control and an inner loop for a closed-loop acceleration control. In this way, an advantageous coupling to a full-load controller is made possible, to be specific in particular to the pitch control.

A transition characteristic, by way of which the proposed control concept, in particular the speed-power control, can be made compatible with the pitch control, is proposed.

Transition functions or concepts for the controlled passing through of speed avoidance regions of points of resonance, and the choice of the switching points in time for passing through the speed avoidance regions, are proposed.

For segments in the partial-load range in which speed power control is proposed, particularly in the upper speed range, at least one segment with a non-vertical speed characteristic is proposed, in particular as a linear segment with a constant slope. In this way, the segment presets power-dependent speed setpoint values.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling a wind power installation, wherein the wind power installation includes:
   an aerodynamic rotor operable at a rotational speed that is variable and having rotor blades with adjustable blade angles, and
   wherein the method comprises:
   controlling the wind power installation in a partial-load range using open-loop operating-characteristic control, wherein:
      the open-loop operating-characteristic control uses an operating characteristic that sets a relationship between the rotational speed and a generator state variable,
      the generator state variable is a generator power or a generator torque, and
      controlling the wind power installation using the operating-characteristic control includes setting the generator state variable using the operating characteristic and depending on a detected rotational speed;
   controlling the wind power installation in a full-load range using closed-loop pitch control, in which the rotational speed is controlled to a speed setpoint value, by adjusting the blade angles; and
   in at least one speed range of the partial-load range and/or in a transitional range from the partial-load range to the full-load range, controlling the wind power installation using speed-power control, in which the rotational speed is controlled to a speed setpoint value, by adjusting the generator state variable, wherein the speed-power control includes an outer cascade and an inner cascade, wherein:
      in the outer cascade, a first closed-loop controller compares a setpoint speed with the detected rotational speed and determines a first acceleration setpoint value of the rotor based on comparing the setpoint speed with the detected rotational speed, and
      in an inner cascade, a second closed-loop controller compares the first acceleration setpoint value with a detected acceleration value of the rotor and determines a generator setpoint value for the generator state variable based on comparing the first acceleration setpoint value with the detected acceleration value.

2. The method as claimed in claim 1, wherein the speed-power control or the second closed-loop controller has an integral component.

3. The method as claimed in claim 1, wherein in the speed-power control:
   the first acceleration setpoint value and the detected acceleration value are respectively formed as an acceleration power, and the acceleration power is assigned to a rotor acceleration and represent a power that results in the rotor acceleration.

4. The method as claimed in claim 1, wherein:
   the first closed-loop controller uses, for determining the first acceleration setpoint value, at least one acceleration limit value, and wherein the at least one acceleration limit value is settable and/or an upper acceleration limit value and a lower acceleration limit value are provided as the at least one acceleration limit value, and/or
   the second controller determines a manipulated variable for setting the generator state variable using an integrator and integrator limitor.

5. The method as claimed in claim 1, wherein
   the at least one speed range is respectively provided as a speed avoidance range and has a lower avoidance speed and an upper avoidance speed;
   the speed-power control is used if the lower avoidance speed is reached when there is increasing rotational speed or the upper avoidance speed is reached when there is decreasing rotational speed;
   when using the speed-power control, the wind power installation, depending on a prevailing wind speed:
      is operated at a first operating point in a first speed range that includes the lower avoidance speed, and
      is operated at a second operating point in a second upper speed range that includes the upper avoidance speed; and
   switching between the first operating point and second upper operating point is performed depending on an aerodynamic evaluation of the first operating point and the second operating point.

6. The method as claimed in claim 5, wherein switching between the first operating point and the second operating point includes:
   determining whether an operating point to which change is made has a higher aerodynamic efficiency than the operating point from which change is made; and determining whether the generator state variable reaches an upper or lower generator state limit.

7. The method as claimed in claim 5, wherein switching between the first operating point and the second operating point is performed in response to an operating point to which change is made has, for a predeterminable checking time period, a higher aerodynamic efficiency than an operating point from which change is made.

8. The method as claimed in claim 5, wherein, a switching time for switching between the first operating point and the second operating point is preset and/or a progression over time is preset for the generator state variable.

9. The method as claimed in claim 1, wherein in the speed-power control, the speed setpoint value is preset as a constant or is preset using at least one speed characteristic, the at least one speed characteristic having speed values that depend on the generator state variable, and the at least one speed characteristic having at least partly a negative slope.

10. The method as claimed in claim 1, wherein:
the transitional range is in a first speed range characterized by rotational speeds from a transitional speed and the first speed range being above a speed avoidance range, and
the wind power installation has a rated speed and the transitional speed is at least 80% of the rated speed and/or of a setpoint speed of the pitch control.

11. The method as claimed in claim 1, wherein:
in the speed-power control, the speed setpoint value is preset using a transitional speed characteristic,
the transitional speed characteristic is vertical, for a rotational speed with a speed value, in correspondence with a transitional speed, so that with an increasing trend of the generator state variable the rotational speed is constant until the generator state variable reaches a predetermined first generator reference value, which is below a rated value of the generator state variable, and/or
from the transitional speed and/or from a second generator reference value, which is below a rated value of the generator state variable, the transitional speed characteristic has a positive slope, so that values of the generator state variable increase with increasing rotational speed until a rated value of the generator state variable is reached.

12. The method as claimed in claim 1, wherein:
a control reserve is determined in dependence on a difference between the generator state variable and a first generator state limit,
the control reserve is transferred from the speed-power control to the pitch control, and
the speed-power control and the pitch control operate at least partially in parallel and are coordinated with each other using the control reserve, or
a switch between the speed-power control and the pitch control is performed depending on the control reserve.

13. The method as claimed in claim 1, comprising:
prioritizing the speed-power control over the pitch control such that the pitch control is at least partially suppressed in response to the speed-power control not reaching a manipulated-variable restriction, and/or
controlling, by the pitch control, the rotational speed based on an acceleration value of the rotor, and suppressing control of the rotational speed by the pitch control in response to the generator setpoint value being below a generator setpoint value in the speed-power control.

14. The method as claimed in claim 1, wherein
the speed-power control uses the generator state variable as a first manipulated variable for controlling the rotational speed,
the pitch control uses the blade angle as a second manipulated variable for controlling the rotational speed, and the blade angles increase with increasing wind speed from a partial-load blade angle, which is set in the partial-load range, toward an end angle, and
the speed-power control is coordinated with the pitch control.

15. The method as claimed in claim 14, wherein the first manipulated variable and the second manipulated variable are coordinated with each other for coordinating the speed-power control with the pitch control.

16. The method as claimed in claim 14, wherein
a manipulated-variable restriction of the first manipulated variable is taken into account, and
the speed-power control and the pitch control are coordinated such that, in response to the first manipulated variable not reaching the manipulated-variable restriction, the speed-power control has a greater influence on the rotational speed than the pitch control, and/or
the second manipulated variable is set in dependence on the manipulated-variable restriction of the first manipulated variable.

17. The method as claimed in claim 16, wherein:
a difference between the first manipulated variable and the manipulated-variable restriction represent an adjustment range of the speed-power control, and
the second manipulated variable is changed such that the pitch control has a smaller influence on the rotational speed the greater the adjustment range of the speed-power control.

18. The method as claimed in claim 1, comprising:
in an outer cascade of the pitch control, comparing, by a third closed-loop controller, a preset setpoint speed with the detected rotational speed and determining a second acceleration setpoint value based on comparing the preset setpoint speed with the detected rotational speed;
in an inner cascade of the pitch control, comparing, by a fourth closed-loop controller, the second acceleration setpoint value with the detected acceleration value and determining a manipulated variable for adjusting the blade angle based on comparing the second acceleration setpoint value with the detected acceleration value;
generating a control error based on comparing the second acceleration setpoint value with the detected acceleration value and modifying the control error using a control reserve; and
providing the modified control error to the fourth controller.

19. The method as claimed in claim 18, wherein:
the second acceleration setpoint value is formed as a power value representing an amount of power that is provided or consumed to reach the second acceleration setpoint value, the detected acceleration value is formed as a power value representing an amount of power that is provided or consumed to reach the detected acceleration value and the control error is formed as a power value representing an amount of power that is provided or consumed to reach the control error,
modifying the control error to cause an adjustment to the blade angle to be reduced, and/or
modifying the control error such that the control reserve or a variable proportional to the control reserve is fed forward to the comparison of the second acceleration setpoint value with the detected acceleration value.

20. The method as claimed in claim 1, wherein in the speed-power control, the first acceleration setpoint value, determined based on a comparison of a preset setpoint speed with the detected rotational speed, is changed depending on the blade angle.

21. The method as claimed in claim 20, wherein, the first acceleration setpoint value is increased by a feedforward value, and the feedforward value is determined based on a differential angle that is a difference between the blade angle and a partial-load blade angle.

22. The method as claimed in claim 1, wherein:
a displacement of a characteristic curve is performed in which the operating characteristic is displaced based on an operating point, a behavior of the pitch control, or a set blade angle, such that a higher value of the generator state variable is set.

23. The method as claimed in claim 22, wherein the operating characteristic is displaced by a predetermined or settable displacement speed that is in a range from 0.3 to 1.5 rotations per minute (rpm).

24. The method as claimed in claim 22, wherein the displacement of the characteristic curve is performed based on a value by which a partial-load blade angle exceeds a partial-load angle.

25. A wind power installation, comprising:
the aerodynamic rotor; and
an open-loop controller configured to control the wind power installation using the method as claimed in claim 1.

26. A wind farm, comprising:
a plurality of wind power installations including the wind power installation as claimed in claim 25.

* * * * *